(12) United States Patent
Aue

(10) Patent No.: US 8,451,758 B2
(45) Date of Patent: May 28, 2013

(54) METHOD AND DEVICE FOR OPERATING OF TWO WIRELESS SERVICES

(75) Inventor: Volker Aue, Dresden (DE)

(73) Assignee: Entropic Communications, Inc., San Diego, CA (US)

( * ) Notice: Subject to any disclaimer, the term of this patent is extended or adjusted under 35 U.S.C. 154(b) by 1073 days.

(21) Appl. No.: 11/996,470

(22) PCT Filed: Jul. 12, 2006

(86) PCT No.: PCT/IB2006/052356
§ 371 (c)(1),
(2), (4) Date: Jan. 22, 2008

(87) PCT Pub. No.: WO2007/010444
PCT Pub. Date: Jan. 25, 2007

(65) Prior Publication Data
US 2008/0186891 A1   Aug. 7, 2008

(30) Foreign Application Priority Data

Jul. 22, 2005   (EP) ..................................... 05015963

(51) Int. Cl.
*H04W 52/02*   (2009.01)
(52) U.S. Cl.
USPC ........... 370/311; 370/307; 370/308; 370/309; 370/310; 370/312
(58) Field of Classification Search
USPC .................. 370/311, 312, 313, 310, 309, 308
See application file for complete search history.

(56) References Cited

U.S. PATENT DOCUMENTS

| 2003/0125019 | A1 | 7/2003 | Bajikar | |
|---|---|---|---|---|
| 2003/0218977 | A1* | 11/2003 | Pan et al. | 370/230 |
| 2005/0105659 | A1* | 5/2005 | Sheu et al. | 375/360 |
| 2007/0064839 | A1* | 3/2007 | Luu | 375/340 |
| 2007/0249391 | A1* | 10/2007 | van Rooyen | 455/552.1 |

FOREIGN PATENT DOCUMENTS

| EP | 1130840 A2 | 9/2001 |
|---|---|---|
| GB | 2394871 A | 5/2004 |
| WO | 0189102 A1 | 11/2001 |
| WO | 2005043906 A1 | 5/2005 |

* cited by examiner

*Primary Examiner* — Brandon Renner
*Assistant Examiner* — Abdelnabi Musa
(74) *Attorney, Agent, or Firm* — Bruce Greenhaus; Richard Bachand; Duane Morris LLP

(57) ABSTRACT

The invention relates to a method and a device for operation of two wireless services whereas a first service is broadcasting signals within burst with known time distances between the bursts and a second service is transmitting signals at least between a first partner and a second partner. The problem to be solved by the invention is to enable a user to use applications of at least to services concurrently at the same time with the same device. The problem is solved by an operation of one and the same device which is receiving bursts in a first mode of the first service and is switched from the first mode into a mode of the second service during the time between the bursts of the service.

20 Claims, 3 Drawing Sheets

METHOD AND DEVICE FOR OPERATING OF TWO WIRELESS SERVICES

CROSS-REFERENCE TO RELATED APPLICATION(S) INFORMATION

Figure 1:
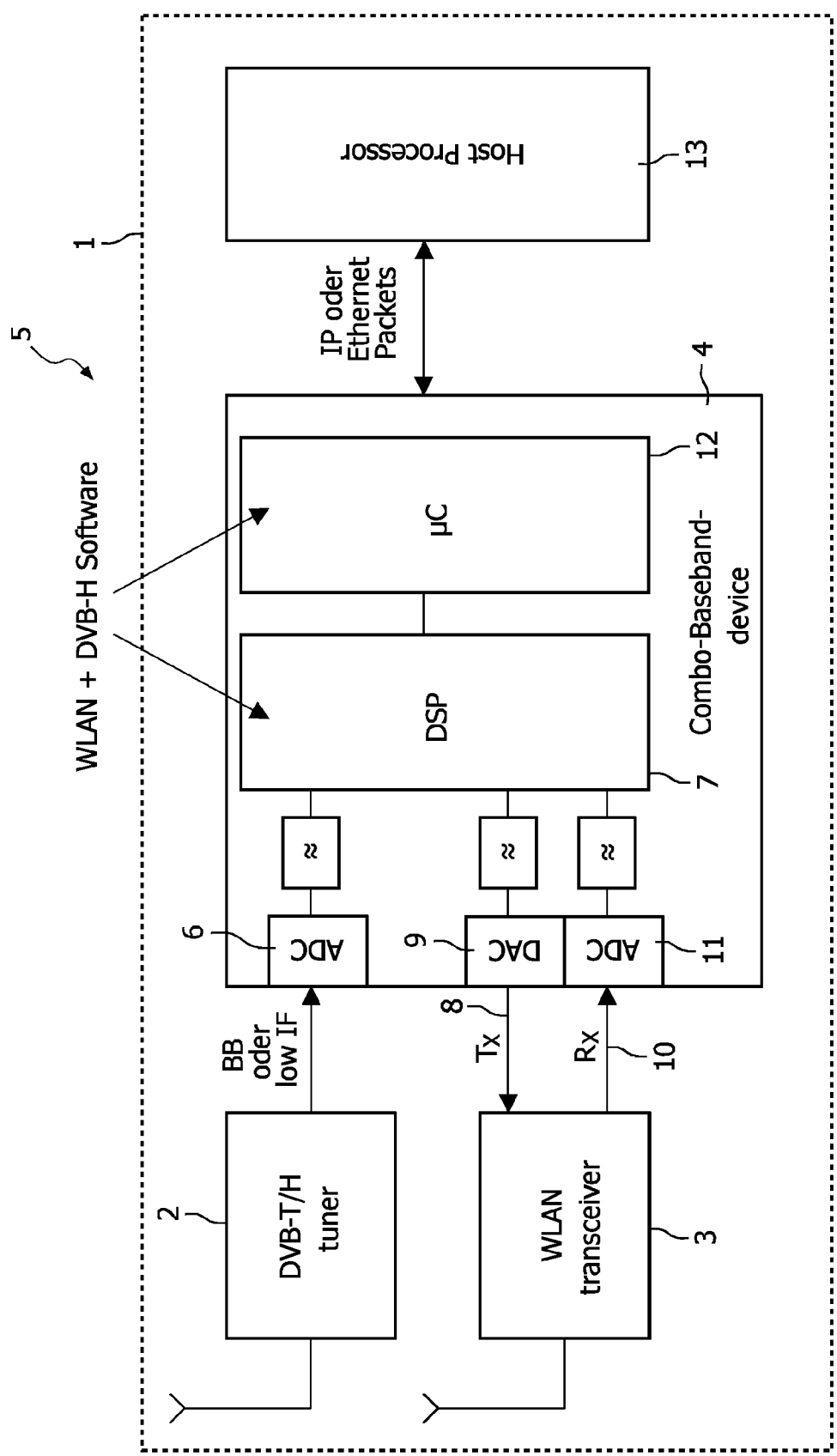

This application is a US national stage entry of, and claims priority under 35 U.S.C. 371 to, PCT/IB2006/052356 filed Jul. 12, 2006, which claims priority to EP application No. 05015963.1, filed Jul. 22, 2005.

The invention relates to a method for operation of two wireless services whereas a first service is broadcasting signals within burst with known time distances between the bursts and a second service is transmitting signals at least between a first partner and a second partner.

The invention also relates to a device for operation of two wireless services whereas a first service is broadcasting signals within burst with known time distances between the bursts and a second service is transmitting signals at least between a first partner and a second partner.

Wireless local area networks (WLAN) devices are increasingly deployed paving the way for new wireless infrastructures in the office, home, and public e.g. wireless internet service points (ISPs). The devices adhere to the recently ratified IEEE 802.11g standard which is an extension (mainly on the physical layer) of the IEEE 802.11 standard. In addition to the so called infrastructure mode, these devices also support an ad-hoc mode. The ad-hoc mode offers additional peer-to-peer communication in the absence of an access point. Wireless LAN modem devices are currently being integrated into high-end mobile cellular platforms for high speed internet access and voice over IP (VoIP) applications. It is expected that within the coming years, the market share of WLAN enabled devices will be significant.

DVB-H (Digital Video Broadcasting-Handheld) is the most promising standard for bringing digital television (TV) to mobile handheld devices. DVB-H is based on the existing DVB-T (Digital Video Broadcasting-Terrestrial) standard and the IP datacasting (IP=Internet Protocol) mode thereof, where the benefit for mobile devices comes from intelligently grouping MPEG transport stream (TS) packets (the interface to the physical layer). In DVB-H, the greatest advantage for a mobile handheld device comes from grouping MPEG-TS packets that belong to a certain IP data stream consecutively to form bursts. So called time slicing information is included in every burst to notify the receiver about the relative time (from the current burst) to the transmission of the next burst. The receiver then can set an appropriate timer and switch off the receiver thereby reducing its on time by more than 90% and saving a great deal of power consumption.

Currently, a strong interest from the market is seen to equip mobile cellular platforms also with DVB-H. Since again, the high-end platform will be the first enabled with TV reception, it is likely that those platforms will have both WLAN and mobile digital TV.

There are similar system requirements and similarities in receiver architectures between WLAN and DVB-H receivers but it is not possible to have both applications running concurrently, e.g., having a WLAN connection and at the same time watching digital mobile TV. In light of voice of internet protocol (VoIP) especially, the concurrent operations of both TVoM and WLAN is a must. The user watching a movie at least wants to be notified about an incoming call.

Voice over IP will become increasingly important: some cellular network providers are currently developing network architectures where cellular network users are automatically handed over to a network providers owned WLAN VoIP enabled hotspot to reduce load on the cellular network.

Other applications that demand concurrent operation can be e-mail download/or notification about new incoming e-mail from the WLAN while the user is watching TV.

The problem to be solved by the invention is to enable a user to use applications of at least two services concurrently at the same time with the same device.

The problem is solved by a method according to claim 1. Further embodiments of the method are claimed in claims 2 to 5.

In the inventive method one and the same device is receiving bursts in a first mode of the first service and is switched from the first mode into a mode of the second service during the time between the bursts of the service. Particularly both services are basing on a OFDM modulation scheme the first service is executed as a DVB-H service and the second service is executed as a WLAN service. Thereby DVB-H bursts are received by the device including information of time difference to the next following burst to be received by the device wherein an operation in DVB-H mode and an operation in WLAN mode are provided by switching from WLAN mode to DVB-H mode during the time between the burst of DVB-H.

The integrated circuits for WLAN reception according to the IEEE 802.11a standard or the OFDM mode in IEEE 802.11g share quite some commonalities with DVB-T receivers:

- Both WLAN and DVB-T (and therefore also DVB-H because it is basing on DVB-T) use OFDM as the principal modulation scheme. The bandwidths of the WLAN OFDM signal (16 MHz) and DVB-T (8, 7, or 6 MHz) are at the same order of magnitude.
- Most of today's WLAN RF receivers are based on the direct-conversion principal. For TV on mobile (TVoM) for power reasons, the same concepts are used. A direct conversion RF receiver suited for WLAN can also be used for DVB-T/H reception, with the local oscillator tuned to support the UHF/VHF frequencies and some additional low pass filtering for 8 MHz to 6 MHz signals. Note that these additional filters can also be implemented in the digital domain.
- Both systems WLAN and DVB-T use OFDM with constellations up to 64 QAM. The required resolutions for the analog-to-digital converter to sample the signal without measurable losses are almost identical. The sample rates due to the bandwidth of the signal are also of the same magnitude. It is likely that the same ADC technology is used for both WLAN and DVB-T/H reception.
- The OFDM modulation is wireless LAN is based on a 64 point fast Fourier transform (FFT) whereas in DVB-T 2048 and 8192 points FFTs are used. DVB-H additionally offers a mode that uses a 4096 point FFT. System analysis shows that the signal processing requirements for the receiver are very similar for the WLAN system, and a DVB-T/H receiver for 8 MHz samples. The higher bandwidth in the WLAN system is compensated for by the fewer calculations needed to calculate shorter FFTs. If the baseband processors are based on a programmable architecture, e.g. a digital signal processor (DSP), both systems may be mapped on an identical DSP core.
- The logic needed for channel decoding appears similar. Both systems use a deinterleaver followed by a depuncturing unit, followed by a convolutional decoder (typically a Viterbi processor). Since the same convolutional code is used for both IEEE 802.11a/g and DVB-T/H, the Viterbi processor can be reused.

The protocol requirements for a standard micro controller are of similar complexity between DVB-H and WLAN.

If data are to be transmitted over WLAN between the access point and the combo WLAN/DVB-H receiver, the device may do so during the intervals between DVB-H bursts which span more than 90% of the time. Since the device 'knows', when the next DVB-H burst is to be received, it enables WLAN power save mode by sending a packet with the power management bit enabled in the frame control field, e.g. a null data frame with power management bit enabled prior to switching to DVB-H mode. A certain guard time may be specified to ensure that this message can be transmitted prior to switching. During this period, the WLAN access point then buffers all pending packets for the device and notifies the device about pending packets in the traffic indication map (TIM) field in the beacon.

After the DVB-H burst reception has finished, the combo device switches back to WLAN operation and waits for the reception of the next beacon. If pending data is indicated by the access point, the combo receiver continues with the procedures as defined in IEEE 802.11, i.e., the device sends a PS poll frame which needs to get acknowledged by the AP. The AP then transmits all pending data either immediately or at a later period.

The problem is further solved by a device according to claim 5. Further embodiments of the device are claimed in claims 7 to 12.

The inventive device comprises first means for reception of bursts in a first mode of the first service and second means for reception and transmission of signals and means for switched from the first mode into a mode of the second service during the time between the bursts of the service. Particularly the first means are suitable for DVB-H operation, the second means are suitable for WLAN operation and comprising both a DVB-T/H Tuner and a WLAN transceiver both connected to a combo baseband device including both the WLAN protocol stack and DVB-H protocol stack as well as the switching means. Alternately thereto the first means are suitable for DVB-H operation, the second means are suitable for WLAN operation and comprising a combo RF device with a receiving part of a DVB-T/H Tuner and a receiving part of a WLAN transceiver and a transmitting part of the WLAN transceiver whereas the combo RF device is connected to a combo baseband device including both the WLAN protocol stack and DVB-H protocol stack as well as the switching means.

A typical DVB-H/WLAN combo receiver for mobile handheld devices using the invention would use the WLAN power save mode in WLAN to reduce power consumption. If no traffic is pending, during WLAN power save mode the combo receiver can easily switch to DVB-H mode for a short period of time to capture the DVB-H mode.

Since the next DVB-H burst is known a priori to the receiver, the receiver can switch to the DVB-H channel to capture the next burst whereas otherwise, i.e. between the burst, it will act to support WLAN.

The commonalities in terms of system requirements between WLAN and DVB-T/H make it possible to map the receivers on similar architectures. Depending on the architectures some parts of those architectures (RF e.g. mixers, ADCs, BB e.g. signal processor) can be shared between both applications to enable cost effective combo solutions that can support either one DVB-T or WLAN. A DVB-H baseband processor with only a small cost adder (as low as 5 percent of additional silicon area) can also be made such that is also can support alternatively WLAN. Those combo solutions can be ideal for the cost sensitive mobile handheld market that is likely to require both WLAN and DVB-H in the same device.

Due to the similar system requirements and similarities in receiver architectures between WLAN and DVB-H receivers, it is possible to share some parts of the receiver to reduce cost and size if both standards are to be supported by the same device.

Generally, the invention overcomes the problem of only supporting either DVB-H reception or WLAN if the same architecture or parts of the architecture are reused for both application supports.

This is done by exploiting the burst nature of DVB-H and making use of the power save mode particularly specified in IEEE 802.11. If the invention is used, a combo device can seamlessly support both WLAN and DVB-H reception. A user watching a movie can still be notified about an incoming VoIP phone call or incoming e-mail. The user can watch TV while waiting for a download/upload on the WLAN network to be completed. Yet, the cost saving of a combo device over two standalone devices, a WLAN networking device and a mobile digital TV receiver are maintained.

Figure 2:
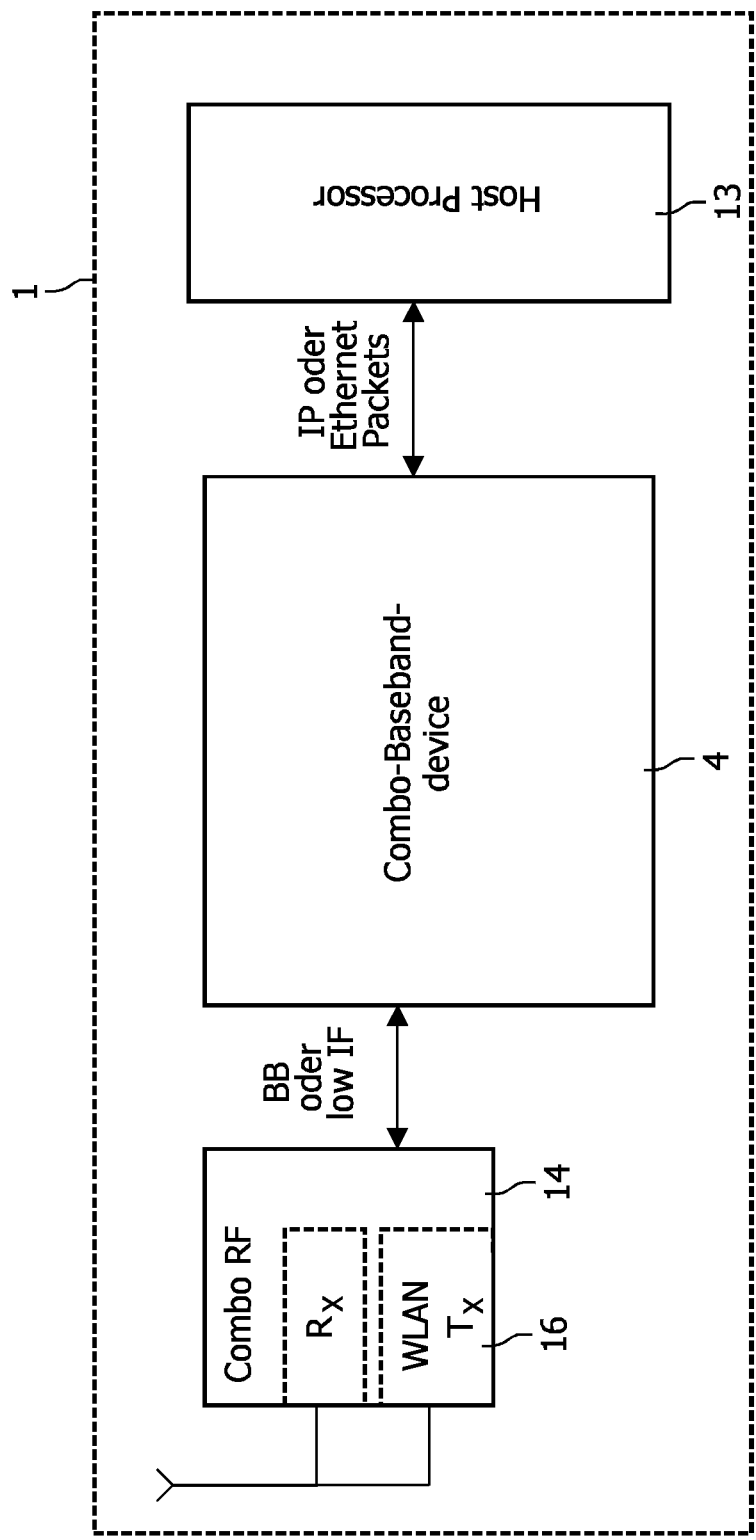

Hereafter the invention is described in more detail by an example. In the drawing shows FIG. 1 a scheme of an inventive device with separate DVB-T/H tuner and WLAN transceiver;

FIG. 2 a scheme of an inventive device with a Combo RF device and

Figure 3:
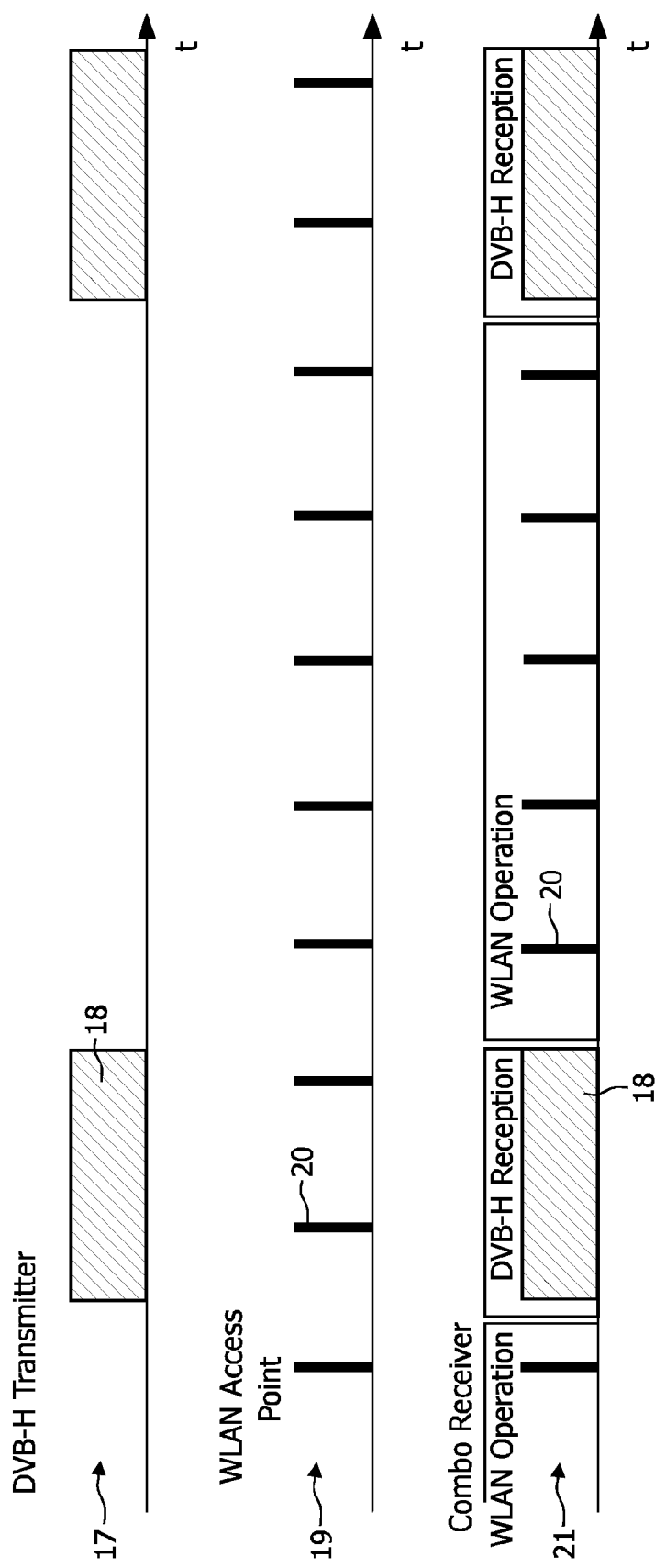

FIG. 3 The timing relations of the WLAN/DVB-H combo device during WLAN standby with concurrent DVB-H reception.

As shown in FIG. 1 a device 1 comprises a DVB-T/H Tuner 2 and a WLAN transceiver 3, both connected to a combo baseband device 4 including both the WLAN protocol stack and DVB-H protocol stack as depicted with WLAN+DVB-H Software 5.

The output of the DVB-T/H tuner 2 leading a baseband or low intermediate frequency (IF) signal is connected to an ADC (analog to digital converter) 6 with a DSP (digital signal processor) 7.

The transmitting input $T_x$ 8 of the WLAN transceiver 3 is connected to the DSP 7 via a DAC (digital to analog converter) 9. Furthermore, the receiving output $R_x$ 10 of the WLAN transceiver 3 is connected to the DSP 7 via an ADC 11.

The DSP 7 is controlled by a microcontroller 12.

The ADCs 6 and 11, the DAC 9, the DSP 7 and the microcontroller 12 are arranged within the combo baseband device 4. The combo baseband device 4 itself is connected to a host processor 13

FIG. 2 shows another embodiment wherein a combo RF device 14 is connected to the DSP 7. The combo RF device 14 is provided with a receiving part $R_x$ 15 of a DVB-T/H Tuner and a receiving part of a WLAN transceiver and a transmitting part $T_x$ 16 of the WLAN transceiver. The combo RF device 14 is connected to the combo baseband device 4 in the same as above mentioned.

The timing relations of the WLAN/DVB-H combo device 1 during WLAN standby with concurrent DVB-H reception are shown in FIG. 3.

The first line 17 shows the timing of the DVB-H burst 18 to be captured. The second line 19 shows the beacons 20 transmitted by the access point (not shown). The third line 21 shows the modes in which the device 1 is working on. The beacons 20 from the WLAN access point are not captured during DVB-H burst reception.

If data are to be transmitted over WLAN between the access point and the device 1, the device 1 may do so during the intervals between DVB-H bursts 18 which span more than 90% of the time. Since the device 1 knows, when the next DVB-H burst 18 is to be received, it enables WLAN power save mode by sending a packet with the power management bit enabled in the frame control field (not shown) as already explained above.

As mentioned above, the key idea of DVB-H is to reduce the "on" time of a DVB-T receiver by transmitting IP encapsulated compressed video in bursts over a DVB-T channel. So called time slice information is included to let the receiver know, when to expect the next burst. The required "on" time is less than 10 percent as compared to continuous reception. As the DVB-H implementation guidelines suggest a 5 seconds period between bursts and a net bit rate of 64 to 384 kbit/s for mobile compressed video, the burst durations are at the order of a few tens to a few hundred milliseconds.

The following table lists the burst durations for 384 kbps, for an 8 MHz DVB-H channel and 5 seconds burst interval for different modulation formats and guard intervals Δ/TU assuming that all MPEG-TS packets are transmitted consecutively within the burst.

TABLE

DVB-H Burst Durations 8 MHz Channel, 5 sec burst interval, 384 kbps net rate

| Modulation | Code rate | Δ/TU = ¼ | Δ/TU = ⅛ | Δ/TU = 1/16 | Δ/TU = 1/32 |
|---|---|---|---|---|---|
| QPSK | ½ | 400 ms | 360 ms | 340 ms | 330 ms |
| QPSK | ⅔ | 303 ms | 273 ms | 258 ms | 250 ms |
| QPSK | ¾ | 271 ms | 244 ms | 231 ms | 224 ms |
| QPSK | ⅚ | 246 ms | 221 ms | 209 ms | 203 ms |
| QPSK | ⅞ | 234 ms | 211 ms | 199 ms | 193 ms |
| 16-QAM | ½ | 207 ms | 186 ms | 176 ms | 171 ms |
| 16-QAM | ⅔ | 159 ms | 143 ms | 135 ms | 131 ms |
| 16-QAM | ¾ | 143 ms | 128 ms | 121 ms | 118 ms |
| 16-QAM | ⅚ | 130 ms | 117 ms | 110 ms | 107 ms |
| 16-QAM | ⅞ | 124 ms | 112 ms | 106 ms | 103 ms |
| 64-QAM | ½ | 143 ms | 128 ms | 121 ms | 118 ms |
| 64-QAM | ⅔ | 110 ms | 99 ms | 94 ms | 91 ms |
| 64-QAM | ¾ | 100 ms | 90 ms | 85 ms | 82 ms |
| 64-QAM | ⅚ | 91 ms | 82 ms | 77 ms | 75 ms |
| 64-QAM | ⅞ | 87 ms | 79 ms | 74 ms | 72 ms |

The durations above include an overhead of 25 symbols for synchronization purposes. It can be seen that the maximum duration occurs for QPSK rate one half. For 16 QAM the maximum duration is 207 ms.

A typical WLAN device used in a mobile handheld would heavily make use of the WLAN power save mode. In power save, only the DTIM beacon, i.e., every n-th beacon with a beacon interval of typically 100 ms needs to be captured. To reduce power consumption in mobile devices it is currently suggested to make the DTIM period at the order of one second.

The device 1, i.e. the DVB-H combo and WLAN combo receiver must be able to quickly switch between WLAN and DVB-H and have both protocol stacks being active either on the same processor or on separate protocol processors.

A common timer (not shown) or a synchronization between the timers used to keep track of the DVB-H timing and a timer used to keep track of the WLAN beacon timing must be included.

If the WLAN receive mode is in stand-by, only the DTIM beacon 20 needs to be received. Likewise, on DVB-H the receiver only needs to be on less than 10% of the time. The key principal of the invention is to switch to WLAN reception during the DVB-H off times. If a beacon 20 collides with the reception of a DVB-H burst 18, priority is given to the DVB-H burst 18 reception.

The WLAN system is fault tolerant. If the WLAN access point has some pending messages signalized in the beacon TIM field (not shown) and the WLAN device does not react on the signal, the pending message flag is simply repeated during the next beacon until a timeout value is reached in the access point. The time out value can be influenced by the listen interval signaled by the station during association. Since the burst lengths in DVB-H span at maximum only a few beacon periods, it is very likely that the device receives the notification about pending packets before the access point times out.

LIST OF REFERENCE NUMERALS:

| | |
|---|---|
| 1 | device |
| 2 | DVB-T/H Tuner |
| 3 | WLAN transceiver |
| 4 | combo baseband device |
| 5 | WLAN + DVB-H Software |
| 6 | ADC |
| 7 | DSP |
| 8 | transmitting input $T_X$ |
| 9 | DAC |
| 10 | Receiving output $R_X$ |
| 11 | ADC |
| 12 | microcontroller |
| 13 | host processor |
| 14 | combo RF device |
| 15 | receiving part RX |
| 16 | transmitting part TX |
| 17 | first line |
| 18 | DVB-H burst |
| 19 | second line |
| 20 | beacon |
| 21 | third line |

The invention claimed is:

1. A method for operation of two wireless services, the method comprising:
   broadcasting, via a first service, signals within burst with known time distances between the bursts;
   transmitting, via a second service, signals at least between a first partner and a second partner;
   receiving, at a single device, bursts in a first mode of the first service;
   switching, via the device, from the first mode into a mode of the second service during the time between the bursts of the service; and
   communicating, via the device, with the second service to pause transmission of data by the second service while the device is receiving a burst;
   characterized in that the first service and the second service are basing on an OFDM modulation scheme the first service is executed as a DVB-H service and the second service is executed as a WLAN service and DVB-H bursts are received by the device including information of time difference to the next following burst to be received by the device wherein an operation in DVB-H mode and an operation in WLAN mode are provided by switching from WLAN mode to DVB-H mode during the time between the burst of DVB-H;
   wherein data is only transmitted over the WLAN service during intervals between the DVB-H bursts, and wherein a WLAN power saving mode is entered during the DVB-H rusts via sending a packet with a power management bit enabled in a frame control field.

2. The method according to claim 1 characterized in that WLAN traffic between the device as the first partner and an access point as the second partner by the device during the device is switched into the DVB-H mode.

3. The method according to claim 1 characterized in that the device as the first partner interchanges data with an access point as the second partner during the intervals between the DVB-H bursts and enables WLAN power save mode by sending a power management bit prior to switching to the DVB-H mode whereas the power management bit enables the access point to buffer all pending packets for the device and to notify the device about pending packets in a traffic indication map (TIM) field in a beacon and after the DVB-H burst reception has finished, the device switches back to WLAN operation mode and waits for the reception of the next beacon and if pending data is indicated by the access point, the device sends a PS poll frame which needs to get acknowledged by the access point and then the access point transmits all pending data either immediately or at a later period to the device.

4. The method according to claim 3 characterized in that the power management bit will be sent within a packet and enabled in a frame control field.

5. A device for operation of two wireless services whereas a first service is broadcasting signals within burst with known time distances between the bursts and a second service is transmitting signals at least between a first partner and a second partner, characterized in that the device comprises a first receiver which receives bursts in a first mode of the first service and a second receiver which receives and transmits signals and a controller capable of switching the device from the first mode into a mode of the second service during the time between the bursts of the service, wherein the controller is capable of communicating with the second service to pause transmission of data by the second service during the reception of a burst by the first receiver;

the device characterized in that the first service and the second service are basing on an OFDM modulation scheme the first service is executed as a DVB-H service and the second service is executed as a WLAN service and DVB-H bursts are received by the device including information of time difference to the next following burst to be received by the device wherein an operation in DVB-H mode and an operation in WLAN mode are provided by switching from WLAN mode to DVB-H mode during the time between the burst of DVB-H;

wherein data is only transmitted over the WLAN service during intervals between the DVB-H bursts, and wherein a WLAN power saving mode is entered during the DVB-H rusts via sending a packet with a power management bit enabled in a frame control field.

6. The device according to claim 5, characterized in that the device comprises a common timer for keeping track of both a DVB-H timing and a WLAN beacon timing.

7. The device according to claim 5, characterized in that the device comprises a timer used to keep track of a DVB-H timing and a timer used to keep track of a WLAN beacon timing and the controller synchronizes both timers.

8. The device according to claim 5, characterized in that the first receiver is suitable for DVB-H operation, the second receiver is suitable for WLAN operation and comprising a combo RF device with a receiving part of a DVB-T/H Tuner and a receiving part of a WLAN transceiver and a transmitting part of the WLAN transceiver whereas the combo RF device is connected to a combo baseband device including both a WLAN protocol stack and DVB-H protocol stack as well as the controller.

9. The device according to claim 5, characterized in that the first receiver is suitable for DVB-H operation, the second receiver is suitable for WLAN operation and comprising both a DVB-T/H Tuner and a WLAN transceiver both connected to a combo baseband device including both a WLAN protocol stack and DVB-H protocol stack as well as the controller.

10. The device according to claim 9, characterized in that the combo baseband device is provided with a protocol processor activating both the WLAN protocol and the DVB-H protocol.

11. The device according to claim 9, characterized in that the combo baseband device is provided with a first protocol processor activating the DVB-H protocol a second protocol processor activation the WLAN protocol.

12. The method according to claim 1 further comprising, in association with switching to WLAN reception during DVB-H off times, giving priority to DVB-H burst reception if a beacon collides with reception of a DVB-H burst.

13. The method according to claim 4 characterized in that WLAN traffic between the device as the first partner and an access point as the second partner by the device during the device is switched into the DVB-H mode.

14. The method of claim 13 further comprising, in association with switching to WLAN reception during DVB-H off times, giving priority to DVB-H burst reception if a beacon collides with reception of a DVB-H burst.

15. The device according to claim 5, configured, in association with switching to WLAN reception during DVB-H off times, to give priority to DVB-H burst reception if a beacon collides with reception of a DVB-H burst.

16. The device according to claim 15, characterized in that the first receiver is suitable for DVB-H operation, the second receiver is suitable for WLAN operation and comprising a combo RF device with a receiving part of a DVB-T/H Tuner and a receiving part of a WLAN transceiver and a transmitting part of the WLAN transceiver whereas the combo RF device is connected to a combo baseband device including both a WLAN protocol stack and DVB-H protocol stack as well as the controller.

17. The device according to claim 7, characterized in that WLAN traffic between the device as the first partner and an access point as the second partner by the device during the device is switched into the DVB-H mode.

18. The device according to claim 17 characterized in that the power management bit will be sent within a packet and enabled in a frame control field.

19. The device according to claim 18 characterized in that WLAN traffic between the device as the first partner and an access point as the second partner by the device during the device is switched into the DVB-H mode.

20. The device of claim 19 configured, in association with switching to WLAN reception during DVB-H off times, to give priority to DVB-H burst reception if a beacon collides with reception of a DVB-H burst.

* * * * *